June 17, 1958 G. H. DABRINGHAUS, JR 2,838,826
TOOL HOLDER AND METHOD OF MAKING SAME
Filed Nov. 8, 1952 2 Sheets-Sheet 1

INVENTOR.
GUSTAV H. DABRINGHAUS JR.
BY
ATTORNEYS

June 17, 1958 G. H. DABRINGHAUS, JR 2,838,826
TOOL HOLDER AND METHOD OF MAKING SAME
Filed Nov. 8, 1952 2 Sheets-Sheet 2
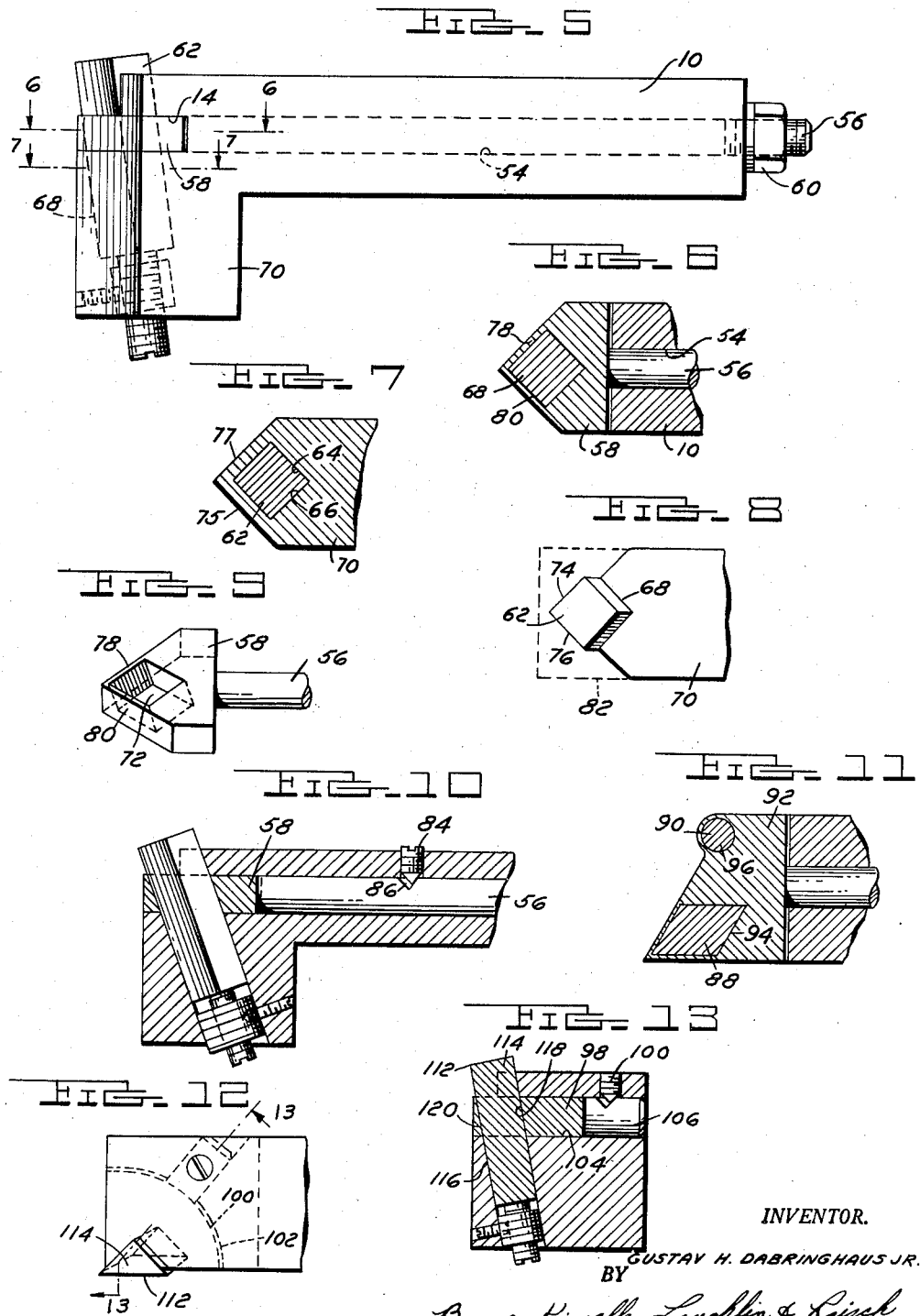
INVENTOR.
GUSTAV H. DABRINGHAUS JR.
BY Barnes, Kisselle, Laughlin & Raisch
ATTORNEYS United States Patent Office 2,838,826
Patented June 17, 1958

2,838,826
TOOL HOLDER AND METHOD OF MAKING SAME

Gustav H. Dabringhaus, Jr., Berkley, Mich.

Application November 8, 1952, Serial No. 319,489

4 Claims. (Cl. 29—96)

This invention relates to a tool holder particularly of the type for holding cutting tools commonly referred to as carbide inserts.

It is an object of this invention to provide a tool holder which is designed for very economic manufacture and which at the same time is arranged to firmly grip the tool in a position for cutting.

A further object of this invention resides in the provision of a tool holder wherein the tool is clamped in position by means of an arrangement generally referred to as a drawbar or an insert and wherein the drawbar or insert is designed to be manufactured economically, to grip the tool firmly with a minimum of metal thickness, and at the same time to provide ample clearance for the cutting edge of the tool.

More specifically the invention contemplates a tool holder having a shank and a depending head at the tool-supporting end thereof. The head has a horizontal slot formed therein in which a drawbar or insert is arranged. The drawbar and the head of the tool are provided adjacent their front end with a through opening adapted to receive the cutting tool. The through opening is inclined rearwardly from top to bottom so that ample clearance is provided at the front end of the holder for the cutting edge of the tool. With this arrangement the wall thickness of the drawbar or insert adjacent the through opening increases in dimension from top to bottom, thus providing sufficient strength where needed to tightly grip the tool in the holder when the drawbar or insert is shifted generally rearwardly of the holder by appropriate means.

In the drawings:

Fig. 5 is a side elevation of a tool holder of modified construction and embodying the present invention.

Fig. 6 is a fragmentary sectional view along the line 6—6 in Fig. 5.

Fig. 7 is a fragmentary sectional view along the line 7—7 in Fig. 5.

Fig. 8 is a fragmentary top plan view of the holder shown in Fig. 5.

Fig. 9 is a fragmentary perspective view of the drawbar employed in the tool shown in Fig. 5.

Fig. 10 is a fragmentary sectional view of a tool holder of the type generally illustrated in Fig. 5 but having a modified form of means for tightening the drawbar against the tool.

Fig. 11 is a fragmentary sectional view of a tool holder generally of the type illustrated in Fig. 5 and fashioned for holding two tools simultaneously.

Fig. 12 is a fragmentary top elevation of a further modified form of the tool holder of this invention.

Fig. 13 is a sectional view along the lines 13—13 in Fig. 12.

Figure 1:
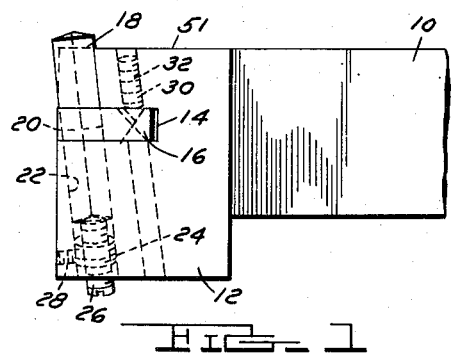
Fig. 1 is a fragmentary side elevation of a tool holder of this invention.
Figure 2:
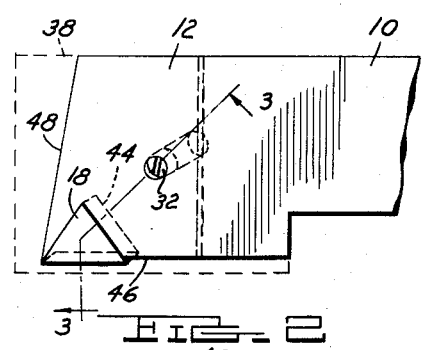
Fig. 2 is a fragmentary top plan view of the tool holder shown in Fig. 1.

Referring first to Figs. 1 through 4, there is illustrated a preferred form of tool holder of this invention which includes a shank 10 provided with a head 12 at the front end thereof. The shank 10 is preferably, although not necessarily, of rectangular cross section and adapted to be securely mounted on the lathe or other machine on which the tool holder is to be used. Head 12 is provided with a generally horizontally extending slot 14 which opens at the front end of the holder. Within slot 14 there is arranged an insert 16 dimensioned to fit nicely within slot 14. The cutting tool 18, which in the form of construction shown in Figs. 1 through 4 is of triangular cross section, is disposed within aligned through openings 20 and 22 in insert 16 and head 12, respectively.

It will be observed that the through openings 20 and 22 are inclined rearwardly in a direction from top to bottom so that the tool 18 is correspondingly inclined when inserted in the holder. Within the lower end of opening 22 there is threaded a bushing 24 which is in turn internally threaded to receive an adjusting screw 26. Screw 26 is provided for adjusting the position of tool 18 upwardly and downwardly on the tool holder and is arranged to be locked by a locking screw 28 which extends through the lower portion of head 12 and bushing 24 into locking engagement with the threads of screw 26.

Head 12 is also provided on the top face thereof with a threaded opening 30 which is inclined parallel to the axis of opening 22. The threaded opening 30 preferably extends through the head 12 of the tool, across slot 14, and down to the bottom face of head 12. A cone-pointed clamping screw 32 is threaded within the opening 30, and its cone point 34 is arranged to engage the rear wall portion of a cone-shaped recess 36 in insert 16 to cam the insert rearwardly in slot 14 when the screw 32 is advanced downwardly in the head 12, thus causing the insert 16 to exert a pressure on the tool which clamps the tool in a generally rearward direction against the faces of the through opening 22 in head 12.

In forming the tool holder illustrated in Fig. 1, the head 12 of the tool is originally larger than its finished form. The original size of the head 12 may be generally designated by the broken lines 38 in Fig. 2. The enlarged size of the head is originally required because of the particular sequence of machining operations employed in forming the tool holder. The first step in forming the tool holder consists in milling the slot 14. The hole 30 is then drilled through the head at a predetermined compounded angle. Thereafter, a bar of steel, which after subsequent machining becomes the insert 16, dimensioned to the size of slot 14, is inserted in slot 14; and this steel bar is center-spotted through the opening 30. The conical recess 36 is thereafter drilled in the insert 16. If desired, the insert may be provided with axially aligned conical recess 36 on both faces thereof as clearly shown in Fig. 3.

After the conical recesses 36 are formed and the hole 30 is threaded, a shim (not shown) is inserted between the rear end face 40 of insert 16 and the inner face 42 of slot 14. Screw 32 is then tightened to clamp the insert in a firmly fixed position in slot 14. With the insert clamped in this position, the assembly is broached to provide the through openings 20 and 22 in the insert and the head of the tool holder, respectively. As was mentioned previously, the axes of the openings 20 and 22 are inclined rearwardly from top to bottom; and in the case of the triangular tool shown, the angle of inclination is compounded so that the tool also inclines laterally of the tool holder. This is more clearly shown by the broken lines 44 in Fig. 2.

With the insert locked in the head of the tool holder as decribed, the head 12 is then machined down to the faces 46 and 48 to remove the excess stock and provide sufficient clearance for the cutting edge 50 of the tool 18. It will be observed that along the face 46 sufficient stock is removed so that opening 22 is opened along this face of the head from the slot 14 upwardly to the top face of the tool holder. The stock removed at the face 46 is preferably sufficient to provide about .010" clearance between the cutting edge 50 of the tool 18 and the face 46 of the holder when the tool is arranged on the holder with its upper end projecting above the top face 51 of the head 12. Faces 46 and 48 are preferably machined perpendicular to the top face 51 of head 12. After machining faces 46 and 48 the tool holder may be heat treated to the desired hardness.

Figure 4:
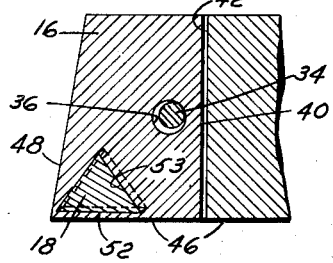
Figure 4 is a sectional view along the line 4—4 in Fig. 3.
Figure 3:
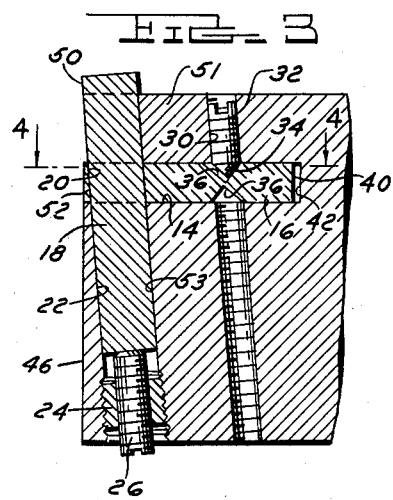
Fig. 3 is a sectional view along the line 3—3 in Fig. 2.

Referring particularly to Fig. 3, it will be observed that, by broaching the openings 20 and 22 at a compounded angle as described, the thickness of the wall of the insert at opening 22 on that side adjacent the cutting edge 50 of the tool increases progressively from the top to the bottom edges thereof. This is shown clearly in Fig. 3, the wall section referred to being designated 52. Thus, the upper portion of this wall portion is sufficiently thin to provide the necessary clearance for the cutting edge of the tool, and the lower portion of this wall portion is sufficiently thick to withstand the pull exerted by the clamping screw 32 which enables the insert 16 to clamp the tool firmly against the rear wall 53 of the opening 22 in head 12 as is shown in Fig. 4.

The threaded hole 30 preferably extends parallel to the axis of opening 22 so that the locking screw 32 can be located relatively close to the tool 18. Extension of this threaded hole 30 through the head 12 of the holder is desirable because it enables the screw 32 to be threaded into opening 30 from the bottom face of head 12 into clamping engagement with the conical recess 36 on the bottom face of insert 16 when the tool holder is supported in an inverted position.

In the modification illustrated in Fig. 5 the shank 10 of the tool holder is provided with a horizontally extending through opening 54 which is adapted to receive a threaded shank or drawbar 56 formed integrally with an insert 58 which is accommodated within the slot 14 in the head of the holder. The primary difference between the holders illustrated in Figs. 5 and 1 is that the locking screw 32 in the device illustrated in Fig. 1 has been replaced by a shank 56 projecting outwardly from the rear end of the tool holder on which is threaded a nut 60 which, when tightened, causes the insert 58 to clamp the tool 62 tightly against the rear faces 64 and 66 of the through opening 68 in the head of the tool holder. It will be observed that in the arrangement illustrated in Figs. 5 through 8 the holder is adapted for gripping a tool of square cross section as distinguished from the tool 18 of triangular cross section.

The through opening 68 in the head 70 of the tool and the aligned through opening 72 in the insert portion 58 are inclined rearwardly from top to bottom. The axis of these openings is, however, not inclined laterally of the tool, since the tool is provided with two symmetrically positioned cutting edges 74 and 76, the forward inclination of the tool providing sufficient clearance between these cutting edges and the front faces 75 and 77 of the holder. It will be observed that the wall portions 78 and 80 on the forward side of the broached opening 72 of insert 58 increase in thickness in a direction from top to bottom. The head 70 of the tool is originally provided with excess stock, such as is indicated by broken lines 82 in Fig. 8, which is removed subsequent to the broaching of holes 68 and 72. The sequence of operations in manufacturing the holder shown in Figs. 5 through 8 is generally the same as described above with reference to the tool holder shown in Figs. 1 through 4.

In Fig. 10 the tool holder there shown is constructed generally the same as that illustrated in Fig. 5 with the exception, however, that the locking nut 60 has been replaced with a cone-point locking screw 84 which is adapted to engage with a conical recess 86 in shank 56 to cam the insert 58 rearwardly when the locking screw 84 is tightened. In Fig. 11 a further modification is shown wherein the tool holder is fashioned to simultaneously support two cutting tools 88 and 90. The heads of the tool holder and the insert 92 are suitably broached with sockets 94 and 96 for supporting the tools 88 and 90 in a forwardly inclined position as mentioned above with reference to the tool holders previously described.

A still further modification is shown in Figs. 12 and 13 wherein the insert portion 98 has a rear face 100 of arcuate shape and the inner face 102 of the insert slot 104 is similarly shaped with an arcuate contour. Insert 98 is provided with a short shank portion 106 having a conical recess 108 which is arranged to be engaged by a locking screw 110 threaded through the top face of the tool holder. When tightened, screw 100 cams the insert 98 in a direction away from the cutting edge 112 of the tool 114 to thereby clamp the tool firmly against the rear walls of the broached opening 116 in the head of the tool holder. It will be noted that the opening 116 and the registering opening 118 in the insert 98 are inclined forwardly and laterally in the manner illustrated with reference to the tool holder illustrated in Figs. 1 through 4. Thus, the wall portion 120 of the insert, which exerts pressure against the tool 114 when the locking screw 100 is tightened, increases in thickness in a direction from top to bottom.

Thus, it will be seen that I have provided a tool holder which is designed not only to hold a cutting tool of the insert type very rigidly in position but which is also designed to be manufactured economically. All of the various embodiments described above are manufactured generally by the same sequence of operations. First, the slot in the tool holder proper is milled for accommodating the insert. The insert is then inserted in the slot and shimmed forwardly, preferably to an extent of about .030". Thereafter, by a single broaching operation the opening for accommodating the tool is formed in both the insert and the head of the tool, this opening being inclined rearwardly away from the cutting edge of the tool so that the wall portion of the insert which exerts a clamping action against the tool increases in thickness from top to bottom. As pointed out above, this inclination provides the necessary clearance for the cutting edge of the tool and at the same time provides a sufficient thickness to the lower portion of the front edges of the insert to withstand the pull necessary to grip the tool tightly in the tool holder.

I claim:

1. A holder for an elongate cutting tool comprising a body having a shank adapted to be secured on the machine on which the cutting tool is to be used and a head at the forward end of said shank, said head having top and bottom faces and a vertical end face and being provided with an elongate opening therethrough which extends to said top and bottom faces, said opening having a cross section corresponding generally in size and shape to the cross section of the tool to be used with said holder and being adapted to receive said tool, said elongate opening having its axis inclined rearwardly towards the shank in a downward direction, said head having a horizontal slot extending transversely therethrough between said top and bottom faces and intersectioning said elongate opening in non perpendicular relation, an insert member in said slot, said insert member having an opening therethrough which is aligned and generally registers with said elongate opening in said head, said insert member corresponding in size and shape with said slot with the exception that the insert member is shorter in length than said slot, said elongate opening in said head intersecting said vertical end face of said head between said slot and the upper face of said head whereby said elongate opening is open at said end face of said head, said insert member having a vertical end face co-planar with said end face of said head and disposed beneath said open face portion of said head whereby the wall portion of said insert member between said end face and the opening in said insert member increases progressively in thickness from top to bottom, and means for drawing said insert member in a generally rearward direction to bring the opening in the insert member out of registration with the opening in said head and thereby clamp a tool in said head.

2. The method of forming a holder for an elongate cutting tool having a cutting edge at one end thereof which comprises providing an elongate shank with a head at one end thereof, forming a slot transversely through said head in a plane spaced between the top and bottom faces of said head, forming an insert member to the approximate dimensions and shape of said slot, fixedly arranging said insert member in said slot so that the insert member is spaced from the inner end of said slot, broaching a hole through said head and insert member at an angle inclined forwardly in an upward direction so that the broached hole intersects the top and bottom faces of said head, said hole being shaped to correspond with the cross section of the tool to be held therein, providing means on said insert member and holder for forcibly shifting said insert member in said slot in a direction towards said inner face of said slot and while said insert is fixed in said slot simultaneously machining the side and end faces of said head and the corresponding faces of said insert member down to the size and shape desired of said head such that said corresponding faces are in co-planar relation.

3. The method of forming a holder for an elongate cutting tool having a cutting edge at one end thereof which comprises providing an elongate shank with a head at one end thereof, forming a slot transversely through said head in a horizontal plane spaced between the top and bottom faces of said head, forming an insert member to the approximate dimensions and shape of said slot, fixedly arranging said insert member in said slot so that the insert member is spaced from the inner end of said slot, broaching a hole through said head and insert member at an angle inclined forwardly in an upward direction so that the broached hole intersects the top and bottom faces of said head and is non-perpendicular to the plane of said insert member, said hole being shaped to correspond with the cross section of the tool to be held therein, machining at least one entire end face of said head and insert member into coplanar relation such that the wall of said insert member between said last mentioned end face and said broached hole in said insert member is substantially reduced in thickness and the portion of said broached hole in said head above said slot is open at said last mentioned end face of said head, and providing means on said insert member and holder for forcibly shifting said insert member in said slot in a direction towards said inner face of said slot.

4. The method called for in claim 2 including the step of positioning a shim between the inner end of said insert member and the inner end of said slot when the insert member is fixedly arranged in said slot.

References Cited in the file of this patent

UNITED STATES PATENTS

| 993,553 | Rosenbeck | May 30, 1911 |
| 1,867,021 | Monosmith | July 12, 1932 |
| 1,993,879 | Ellingham | Mar. 12, 1935 |
| 2,624,103 | Bader | Jan. 6, 1953 |
| 2,641,049 | Kennicott | June 9, 1953 |
| 2,648,647 | Sternbergh et al. | Aug. 25, 1953 |

FOREIGN PATENTS

| 234,828 | Switzerland | Oct. 31, 1944 |